United States Patent [19]

Blevins et al.

[11] 4,085,445

[45] Apr. 18, 1978

[54] TEXT MERGE WITH COPIES AND ENVELOPES

[75] Inventors: Margaret Mary Blevins, Lexington, Ky.; Robert Glenn Bluethman, Austin, Tex.

[73] Assignee: International Business Machines Corporation, Armonk, N.Y.

[21] Appl. No.: 693,818

[22] Filed: Jun. 7, 1976

[51] Int. Cl.² .......................... G06F 3/12; G06F 7/22
[52] U.S. Cl. .................................................... 364/900
[58] Field of Search ................ 197/19; 101/90, 93.11, 101/93.12; 340/172.5

[56] References Cited

U.S. PATENT DOCUMENTS

| 3,474,416 | 10/1969 | Mason | 340/172.5 |
| 3,675,207 | 7/1972 | Schlickeiser | 340/172.5 |
| 3,958,224 | 5/1976 | Boyd et al. | 364/900 |

*Primary Examiner*—Gareth D. Shaw
*Assistant Examiner*—Thomas M. Heckler

*Attorney, Agent, or Firm*—Douglas H. Lefeve

[57] ABSTRACT

Disclosed is a system and method for interleaved printing of letters and envelopes in an unattended manner. The system includes a memory for storing in a first portion thereof, text codes and control codes corresponding to the constant text of a form letter and envelope to be printed. As required, one or more blocks of variable data are written into the memory succeeding the form letter and envelope. The system is operative to output the contents of the memory to a printer while merging the variable data with the form letter and the envelope for a completed letter followed by the envelope. Logic is provided to utilize a selected field of a record of variable data exclusively in either the letter or envelope. The printing system is also operative to print more than one copy of the same letter before printing the envelope. All of the printing relative to the record is performed, however, before the next record is read so that distribution of the letter to all recipients can begin when the next record is read.

8 Claims, 8 Drawing Figures

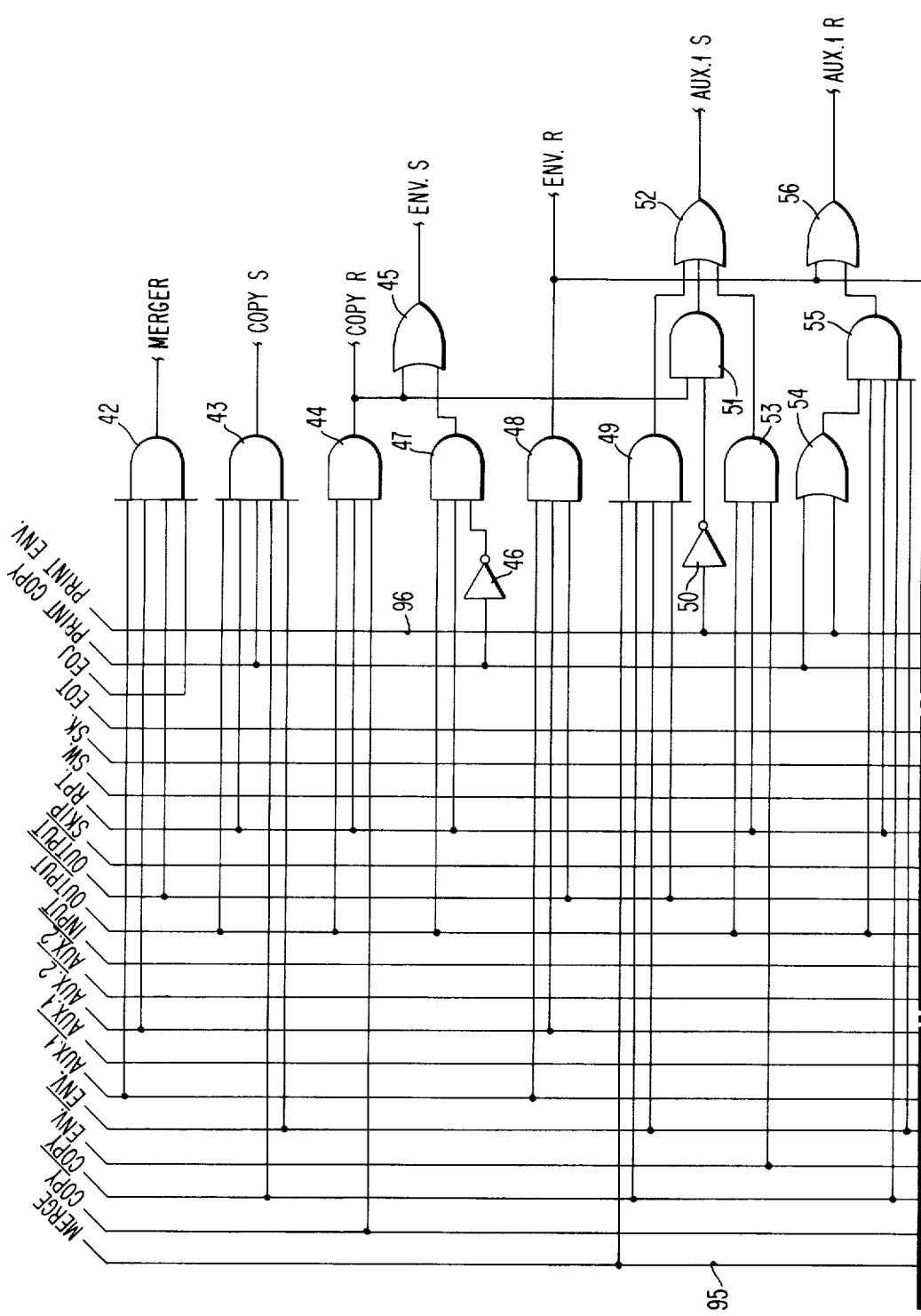

TEXT MERGE WITH COPIES AND ENVELOPES

CROSS-REFERENCE TO RELATED APPLICATIONS

U.S. patent application Ser. No. 595,840, filed July 14, 1975, now U.S. Pat. No. 4,064,557 having Robert Glenn Bluethman, et al as inventors and entitled "System for Merging Data Flow", assigned to the assignee of the present application.

BACKGROUND OF THE INVENTION

1. Field of the Invention

This invention relates to printing systems in general, and more particularly to a system including a printer driven from a memory in which stored constant and variable data are automatically and selectively merged during printing.

2. Description of the Prior Art

The above-referenced, copending patent application Ser. No. 595,840 describes a system in which one portion of a memory is loaded with fixed data, such as text codes and control codes for printing the constant portions of a repetitive form letter, while the remainder of the memory is loaded with variables to be included in one or more of the letters to be printed according to the form letter. As an example, a letter of congratulations could be sent to fifty graduates of a marketing training class by loading the constant, congratulatory text into one portion of the memory of the names and addresses of the graduates into another portion of the memory. SWITCH codes are used to indicate the locations in the form letter requiring the addition of a field from the variables to personalize the form letters. For example, after the date in the form letter, a SWITCH code may be utilized to read variables including the name and inside address of the addressee until a SWITCH code at the end of the inside address in the variables causes reading of the memory to switch back to the "Dear" in the form letter. After the "Dear" in the form letter, a SWITCH code would again switch reading of the memory contents back to the variables for the name of the addressee, which in the variables, would be followed by another SWITCH code to cause playout of the form letter to continue.

One of the problems with the above described system is that no practical provision is included for the printing of envelopes to be associated with the personalized form letters other than the obvious solution of limiting the variables in the letter to an inside address that can also be used for addressing the envelopes. This solution had the problem of requiring the salutation as well as the remainder of the text to use only form text, for example, "Dear Marketing Training Graduate", since inclusion of additional variable fields to further personalize the letter could not be used on the envelope. Additional personalizing fields can be included if the system is set up to tab the print carrier off of the envelope to print the variable fields not pertinent to the envelope, but this causes unnecessary time delays for printing this extraneous data as well as additional printer wear.

Thus, previous solutions to the problem of printing envelopes along with the form letters have required (1) a lower degree of personalization of the letters than is desirable, or (2) the additional printing of the remainder of the record not pertinent to the envelope. Thus, it would be desirable to employ, for printing of both form letters and envelopes, a single record including, without repetition, those fields needed for both the form letter and the form envelope with means operable to skip particular fields of the record that are not to be included on the envelope and, additionally, to skip other fields of the record that are not to be included with the letter. Further, it would be advantageous to print all copies of a particular letter during the same operation, followed by an envelope, so that distribution of the letters can begin at the start of printing of the next succeeding letter which utilizes a different record of variables.

SUMMARY OF THE INVENTION

Accordingly, a system and method are provided for automatically printing letters and envelopes in an unattended, interleaved manner. The variable data for a letter and associated envelope is contained in a single record which includes a number of fields of text and control characters. The form letter, personalized by the inclusion of this variable data, along with any copies thereof are printed, after which an envelope to the addressee of the letter is printed. After the letter, all copies thereof, and the envelope are printed for a particular record, the first block of a new record of variables is written into the memory for printing of another set of letters and an associated envelope. Since all copies of the previous letter, as well as an envelope are available, all printing utilizing the previous record has been completed and distribution of the letter and any copies thereof can immediately begin.

Means are provided for skipping particular fields in the record while printing the letter and skipping other particular fields of the record while printing the envelope. Thus, during the printing of either the letter or the envelope, only those variables associated with the particular document (letter or envelope) are printed and no time consuming printing of fields off of the envelope or off of the letter is required.

In the operation, the form letter comprising the constant text and control codes for the letter is first stored into the memory of the system. A form envelope is stored in the memory immediately following the form letter. The form envelope is a framework keyed with SWITCH codes to allow printing the addressee's names and address at the right place on the envelope and, possibly, some constant text such as a return address. In either the form letter or the form envelope, a SKIP code instructs the system to skip the next field of variables and to continue printing from the form text. In this way, personalized entries other than address information can be skipped for printing the envelope. Similarly, the envelope may contain some text not wanted in the letter, such as an attention line. Thus, one record including a plurality of fields serves for both the letter and envelope.

Output of text from the memory to the printer begins at the first character of the form letter. When a SWITCH or SKIP code in the form letter is encountered, a block of variables is written into the memory succeeding the form envelope. Fields of the block are merged with the form letter and additional blocks of variables from a single record are written into the memory until a REPEAT code at the end of the form letter is encountered, signifying the end of the letter. The same text is merged and printed again for copies of the letter. An envelope is then printed by merging the variables of the record with the constant text and control codes stored for the form envelope.

BRIEF DESCRIPTION OF THE DRAWING

FIGS. 4, and 5a–5c are detailed logic diagrams which, along with FIG. 1 depict a preferred embodiment of the system of this invention for merging text for copies and envelopes.

DESCRIPTION OF THE PREFERRED EMBODIMENT

It is assumed, for the purposes of illustration, that logic requiring positive inputs for a positive output is employed unless otherwise indicated. That is, the logic circuits such as AND and OR gates, for example, are operated by positive signal levels at the inputs to produce a positive signal level at the output. Logical levels which are not positive will be termed negative.

Figure 1:
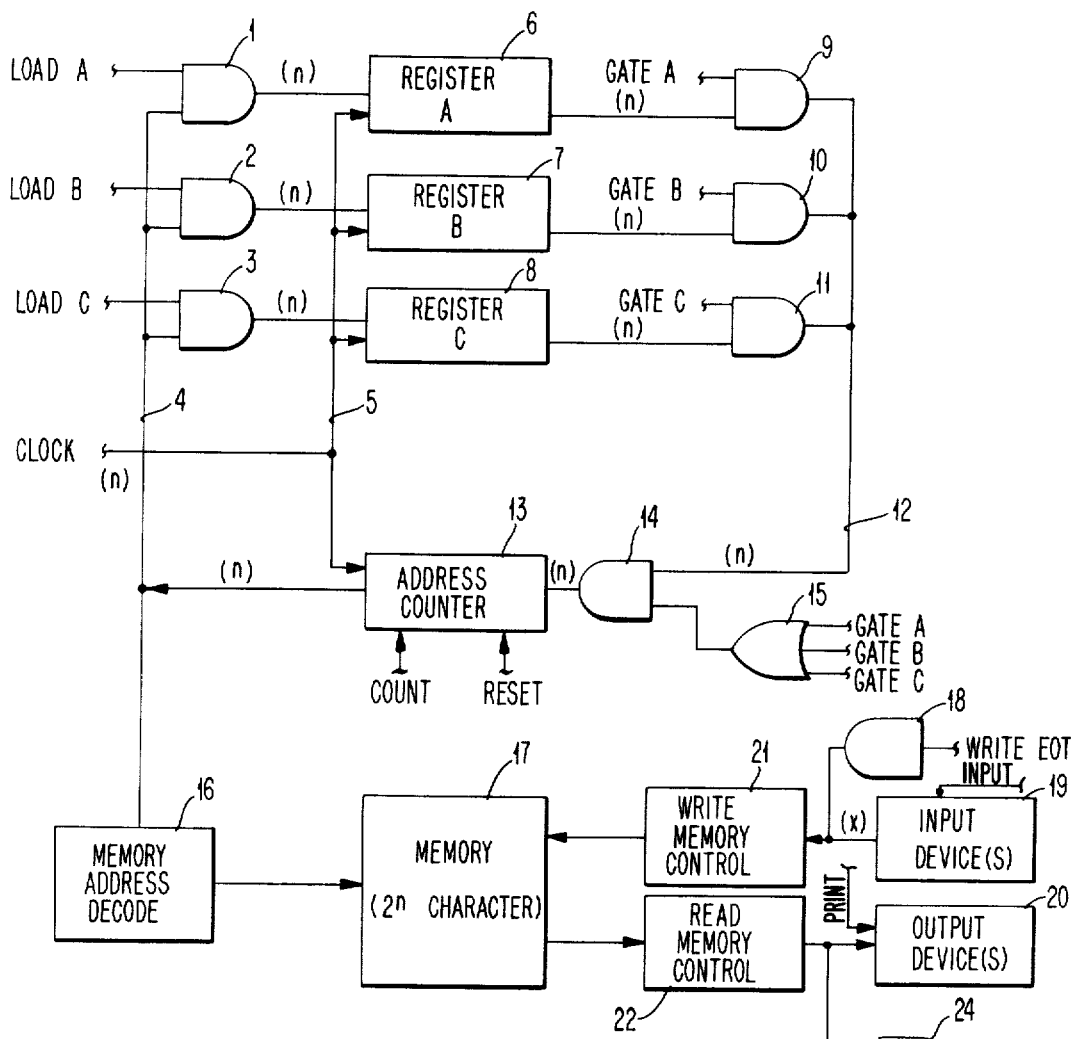
FIG. 1 depicts an embodiment of a portion of the printing system of this invention. including the memory, memory address registers, data bus, and input/output devices.
Figure 4:
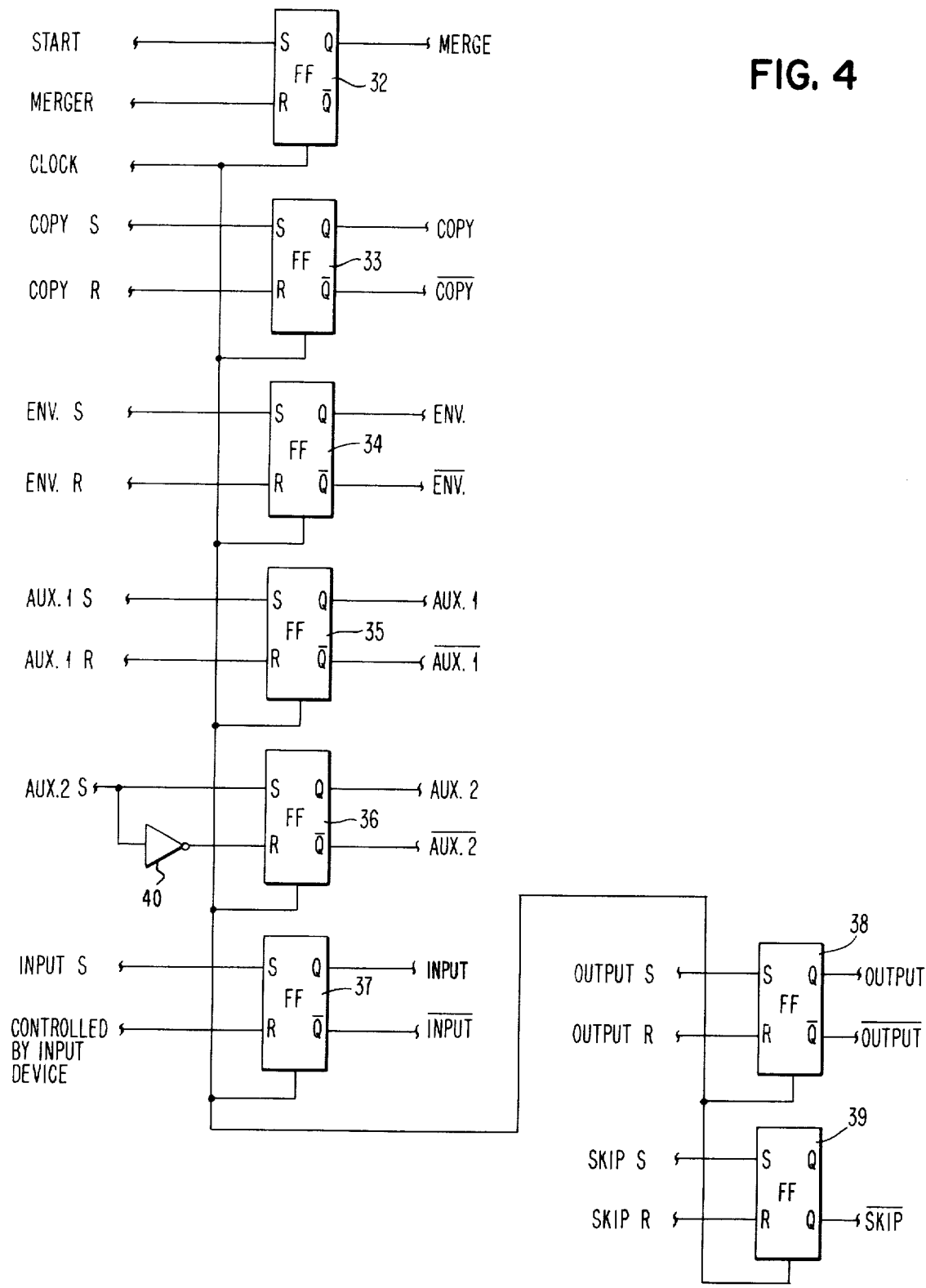

It will also be understood by those skilled in the art that the logical storage devices such as registers, flip-flops, counters, shown in FIGS. 1 and 4 are responsive to clock signals to assume, at the next leading edge of the clocking waveform, a state associated with an input signal applied thereto immediately before the leading edge of the clocking waveform, such logic being referred to in the art as synchronous logic. For the purposes of description hereinafter, one clock period will be referred to as a "bit time".

Figure 2:
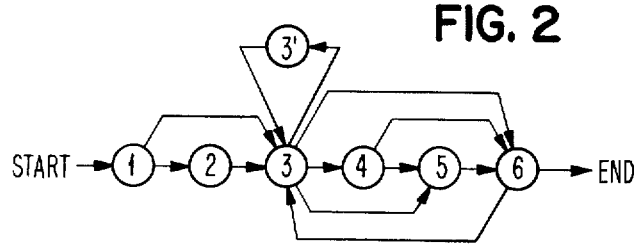
FIG. 2 is a diagram showing the sequence of operation of the printing system.

Referring now to FIG. 2 of the drawing, after a START signal to initiate the beginning of a text merge operation is received by the system, the states assumed by the system are as follows:

(1) Store form letter into memory;
(2) Store form envelope into memory;
(3) Merge text for original of letter, including; (3') Store block of variables, as needed, for letter and envelope;
(4) Merge text for copy;
(5) Merge text for envelope;
(6) Reset addresses for the next set of variables.

Assume now that it is desired to print an original and a copy of a personalized form letter as well as an envelope for the original of this letter. Referring now to FIG. 1 it is first necessary to write the form letter (constant text and control codes for the personalized form letter) into memory 17. The form letter is generated at an input device 19 which may, for example, comprise a keyboard, magnetic card recorder, or data communications adapter, the details of which do not form a part of this invention. Form letter text generated or communicated by an input device 19 is loaded into memory 17 by write memory control 21. Similarly, a form envelope comprising the constant text and control codes for proper positioning of the variable fields of the envelope are generated or communicated by input device 19 through write memory control 21 into the memory 17. Thus, the form envelope is stored in memory 17 immediately succeeding the form letter. A REPEAT control code is included at the end of both the form letter and the form envelope. Thus, after storing the form letter and the form envelope in the memory, the memory organization is as follows:

FORM LETTER-REPEAT CODE-FORM ENVELOPE-REPEAT CODE

It is assumed now that the memory 17 storage location currently addressed is the next address following that of the REPEAT code which follows the form envelope. Thus, memory address decode 16 (FIG. 1) currently indicates the next memory 17 storage location beyond the REPEAT code of the form envelope.

Figure 3A:
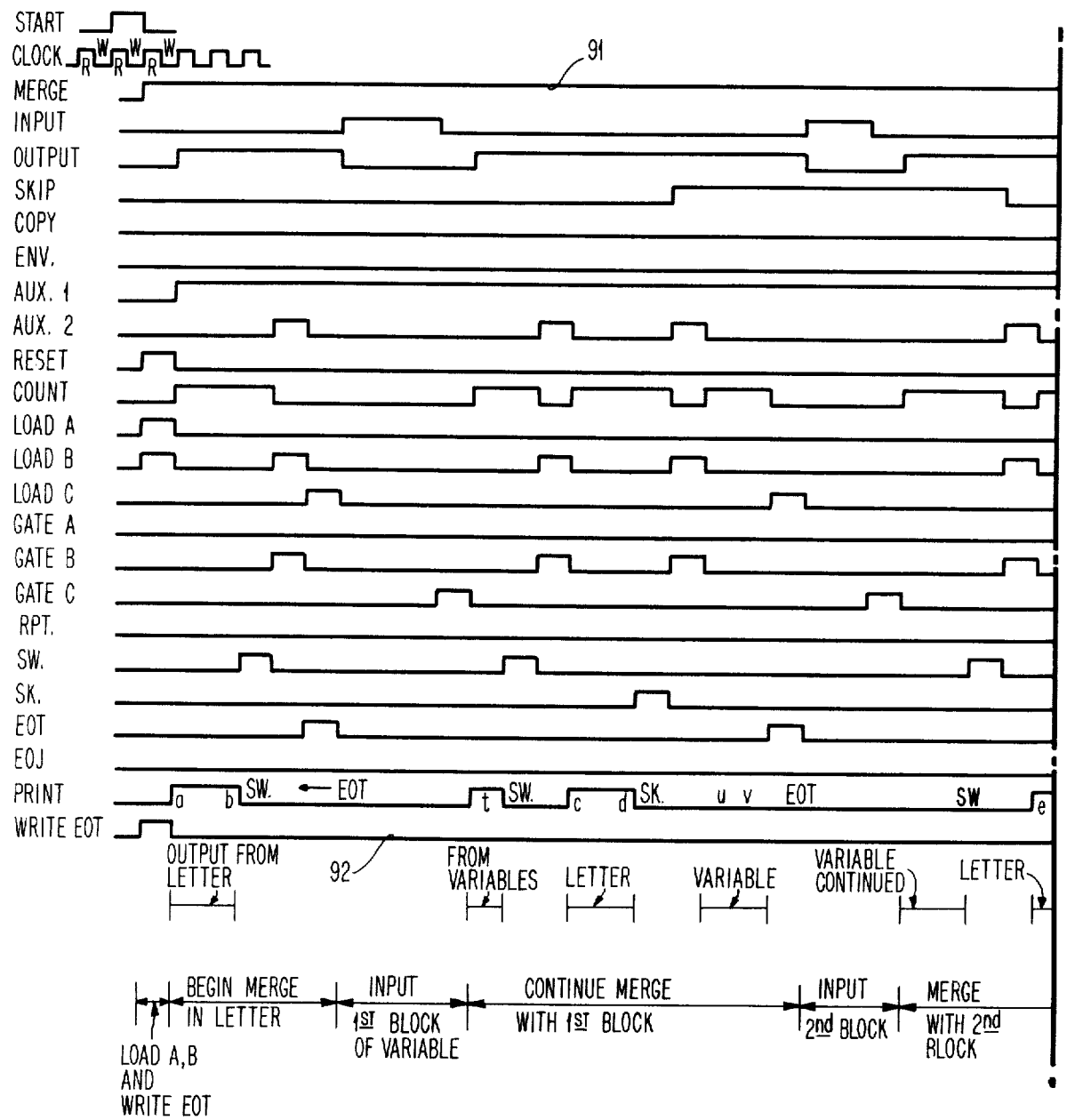
FIGS. 3a and 3b are timing diagrams illustrating the sequence of operation of the logical elements of FIGS. 1, 4, and 5a–c.
Figure 3B:
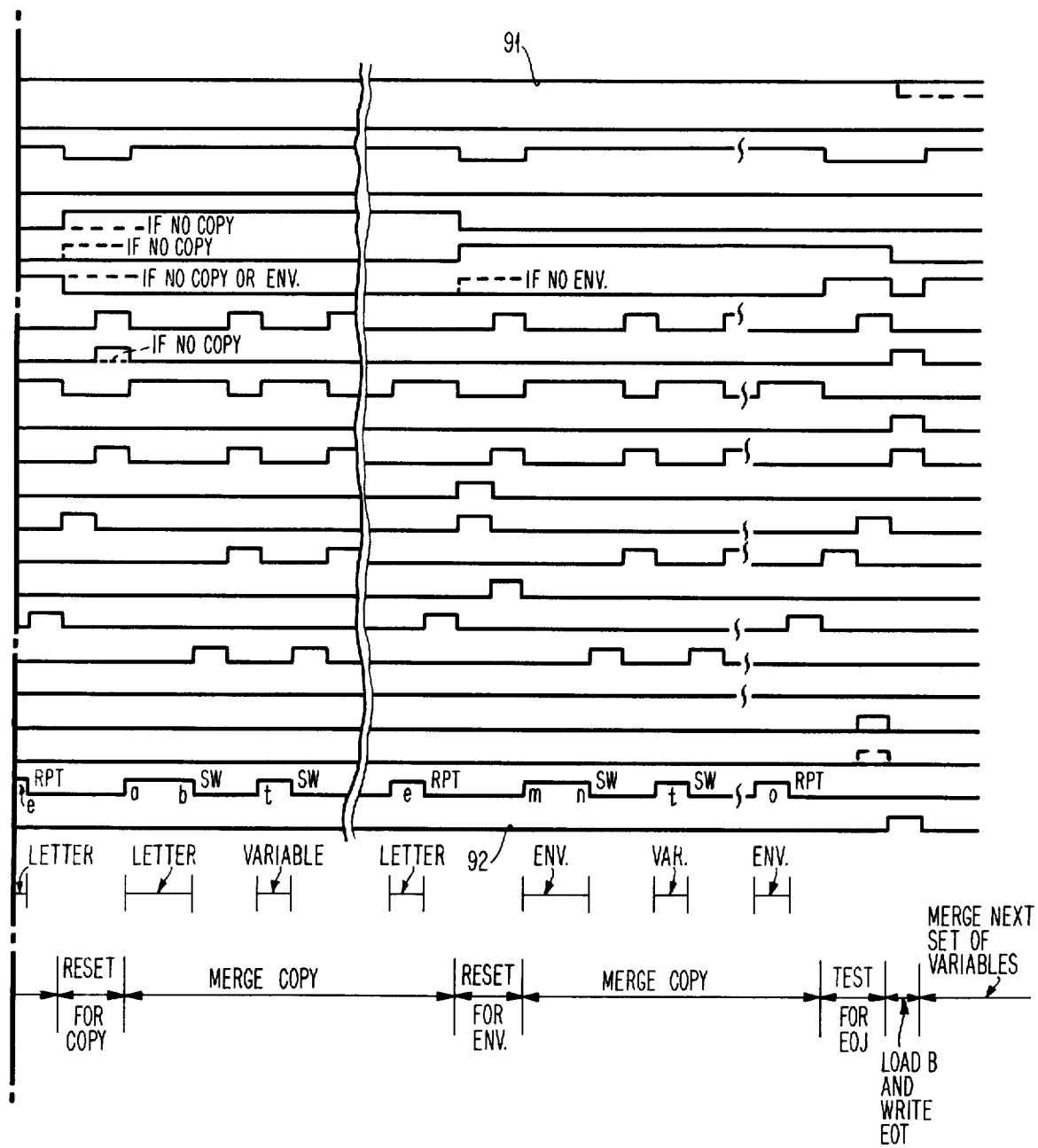
Figure 5B:
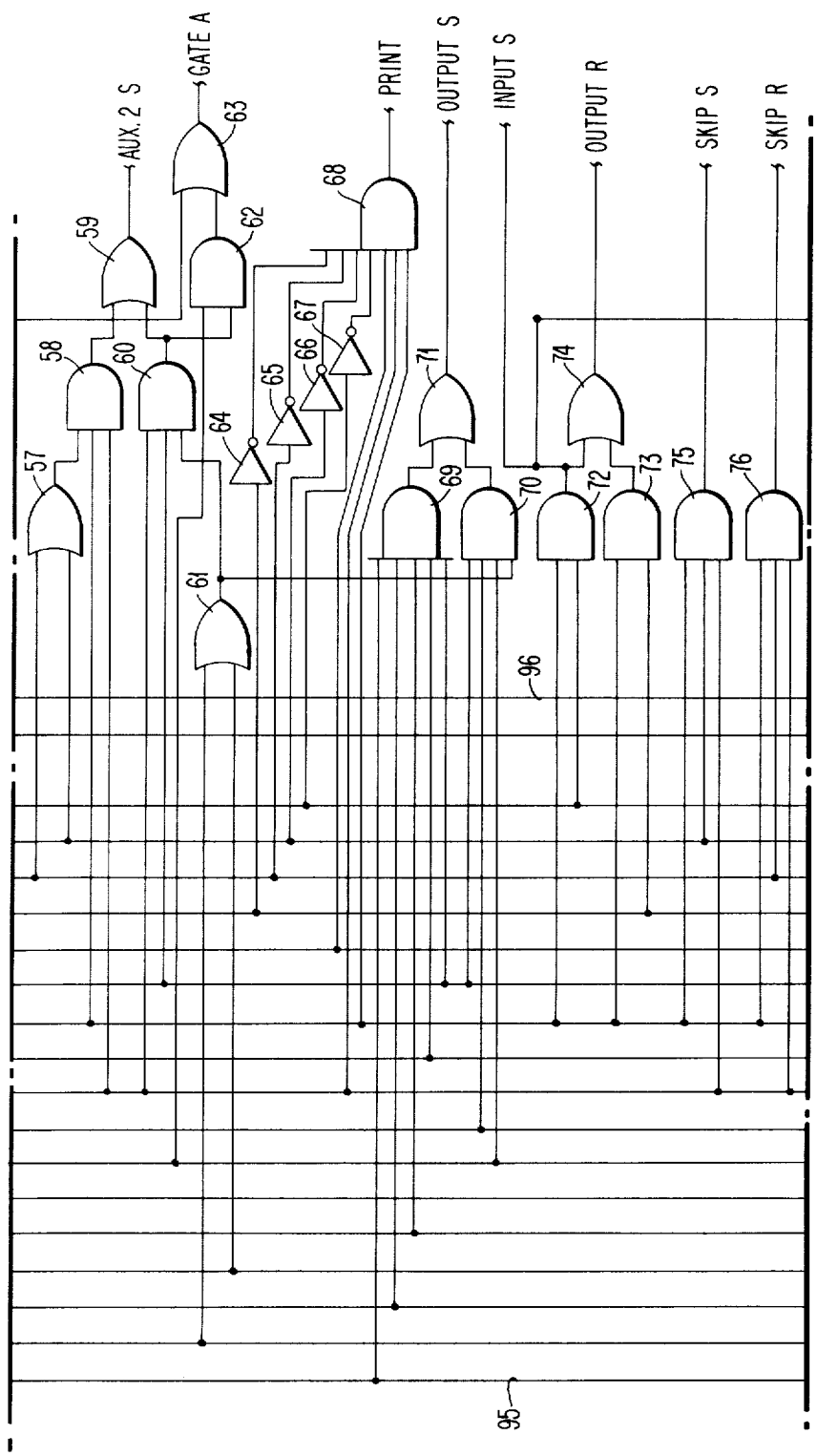
Figure 5C:
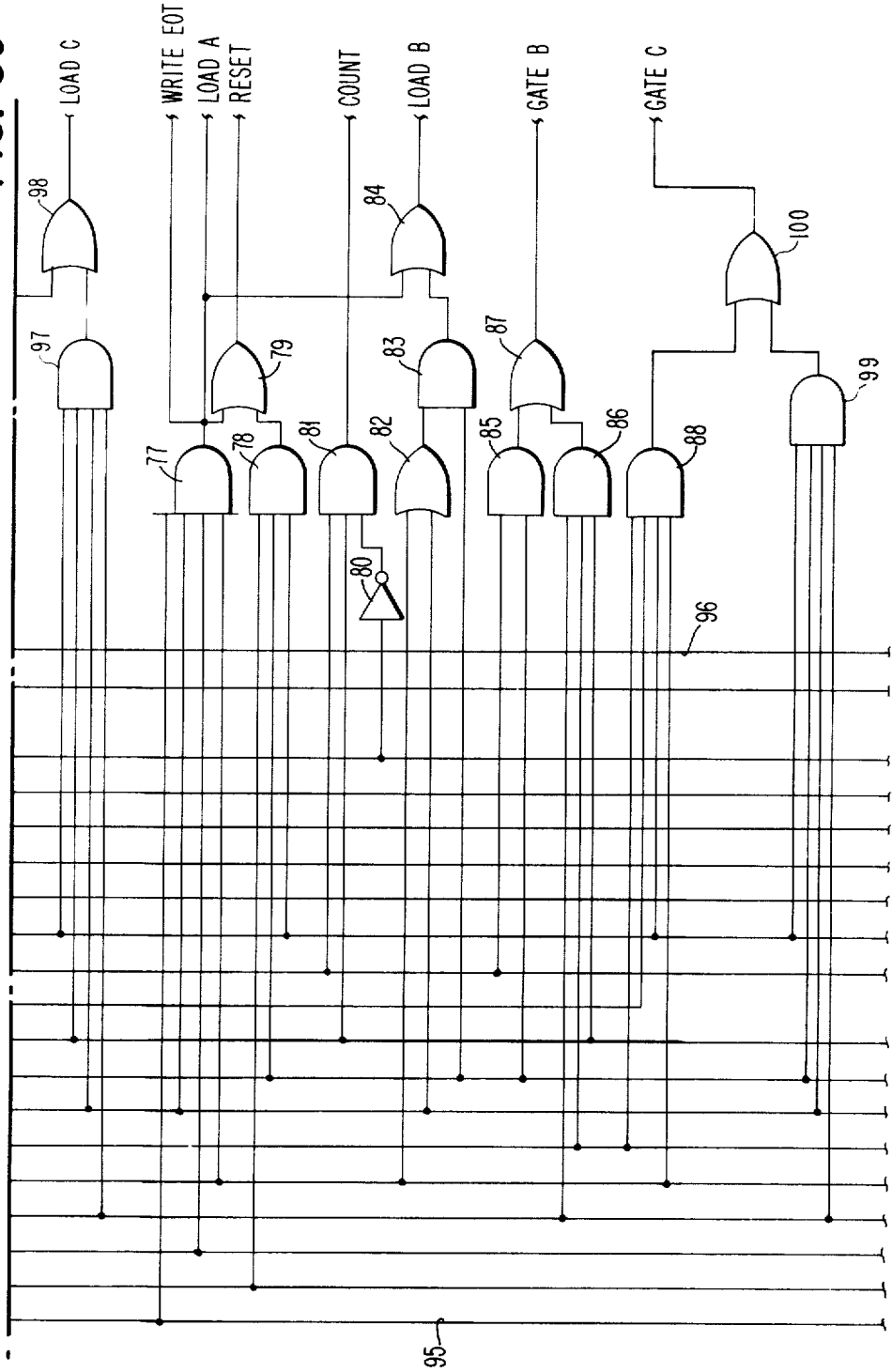

For the purposes of description of the text merge operation, it is assumed that each of the registers, counter and flip-flops are reset or set to zero, according to their function. Referring now to the logic diagrams in FIGS. 1, 4, and 5a–c and the timing diagrams in FIGS. 3a and 3b the text merge printing operation is initiated by sensing of the START signal which sets flip-flop 32 to produce the MERGE signal at the next bit time. (When referring to FIGS. 3a and 3b, lines 91 and 92 on each sheet thereof should be aligned. Similarly, lines 95 and 96 on each sheet of FIGS. 5a–c should be aligned). Since flip-flops 33, 34 and 35 are reset, the $\overline{\text{COPY}}$, $\overline{\text{ENV}}$, $\overline{\text{AUX 1}}$ signals therefrom, along with the MERGE signal are applied to AND gate 77 to generate the WRITE EOT signal. The WRITE EOT signal is applied through AND gate 18 to force an EOT control code at the input to the WRITE memory control 21. This will cause the WRITE memory control 21 to WRITE an EOT (End of Text) control code into memory 17 at the memory location immediately following the REPEAT code at the end of the form envelope. Memory organization is then as follows:

FORM LETTER-REPEAT CODE-FORM ENVELOPE-REPEAT CODE-EOT

The WRITE EOT signal is also gated through OR gate 79 to provide the RESET signal that is applied to address counter 13 to again reset this counter to zero at the next bit time. At the same time that the WRITE EOT signal is generated, the LOAD A signal, also an output of AND gate 77, is applied to an input of AND gate 1 to load the current address of address counter 13 into register A (reference numeral 6) at the next bit time. This LOAD A signal is also gated through OR gate 84 to generate the LOAD B signal. Thus, at this same time, the LOAD B signal is applied to an input of AND gate 2 to cause the same address in address counter 13 to be gated into register B (reference numeral 7) at the next bit time. It will be understood that this address to be loaded into registers A and B is the address of the EOT code following the REPEAT code which follows the form envelope. During this same bit time an OUTPUT S signal is produced at OR gate 71 by virtue of an input thereto from AND gate 69 which receives the positive signals MERGE, COPY, $\overline{\text{ENV}}$, $\overline{\text{INPUT}}$, and $\overline{\text{OUTPUT}}$. Also, the AUX 1 S signal is produced by OR gate 52 by virtue of an input thereto from AND gate 48 having the positive input signals, MERGE, $\overline{\text{COPY}}$, $\overline{\text{ENV}}$, and $\overline{\text{OUTPUT}}$.

At the following bit time the OUTPUT flip-flop 38 is set from the OUTPUT S signal generated at the preceding bit time. Similarly, flip-flop 35 is set to produce the AUX 1 signal because of the AUX 1 S signal applied to the input thereof that was generated at the preceding bit time. When flip-flops 35 and 38 are set, the PRINT signal is output from AND gate 68 by virtue of the OUTPUT signal applied thereto as well as the $\overline{\text{AUX 2}}$, and $\overline{\text{SKIP}}$ signals, and, additionally, the positive output signals from INVERT circuits 64–67. INVERT circuits 64–67 generate positive outputs by virtue of the negative outputs of AND gate decodes 24–27, respectively, which currently decode negative output signals RPT, SW, SK, EOT, respectively, because of the lack of a REPEAT, SWITCH, SKIP, or EOT code on the data bus 23 during this bit time. Also, the COUNT signal is produced by AND gate 81 at this bit time by virtue of the positive OUTPUT signal, the positive $\overline{\text{AUX 2}}$ signal and the negative EOT signal from AND gate 27 that is inverted by INVERT circuit 80 and applied to a third input of AND gate 81.

The PRINT signal is applied to an output device 20, such as a printer, to cause printing of the character on data bus 23 that is placed on the data bus from memory 17 by the read memory control 22. It will be remembered that the first memory storage location is being addressed since address counter 13 was reset at the previous bit time. Thus, the first character of the form letter is printed at this bit time. Simultaneously, the COUNT signal is applied to address counter 13 to bump the address counter 13 at the next bit time which, in turn, causes printing of the second character of the form letter.

Printing of the constant text and control codes of the form letter continues until a SWITCH code is detected on data bus 23 by AND gate decode 25, at which time the PRINT signal from AND gate 68 becomes negative by virtue of the positive SW signal input to INVERT circuit 65. The COUNT signal remains positive for one more bit time after the SWITCH code is detected so that at the next bit time address counter 13 addresses the character in the form letter following the SWITCH code.

During the same bit time, the AUX 2 S signal is provided by OR gate 59 by virtue of an input thereto from AND gate 58 having the positive inputs of $\overline{\text{AUX 2}}$ and OUTPUT and a positive input from OR gate 57 by virtue of the SW signal applied to an input thereof. Thus, flip-flop 36 becomes set to provide the positive AUX 2 signal at the bit time after the SWITCH code is decoded. At this next bit time, the LOAD B signal is produced by OR gate 84 by virtue of an input thereto from the presently positive output of AND gate 83. AND gate 83 is currently positive because of a positive AUX 2 signal input thereto as well as a positive output signal from OR gate 82 provided by virtue of a positive $\overline{\text{ENV}}$ signal applied thereto. The positive LOAD B signal is applied to an input of AND gate 2 to cause the contents of address counter 13 to be loaded into register B at the next bit time. At the same time that the LOAD B signal is produced, a positive GATE B signal is generated by OR gate 87 by virtue of the positive OUTPUT and AUX 2 signals applied to the input of AND gate 85. The positive GATE B signal is applied to an input of AND gate 10 and to an input of OR gate 15 to cause the current contents of register B to be loaded into the address counter 13 when the current contents of address counter 13 are loaded into register B at the next bit time. That is, at the next bit time the contents of register B and the contents of address counter 13 are exchanged.

At this next bit time, flip-flop 36 becomes reset because of the positive reset input thereto from INVERT circuit 40. Address counter 13 now addresses the memory location storing the EOT code previously loaded into memory 17. Thus, the EOT code is present on data bus 23 and a positive EOT signal is generated by AND gate decode 27. This positive EOT signal is applied to AND gate 72 along with the positive OUTPUT signal to generate a positive signal that is gated through OR gate 98 during this bit time to generate a positive LOAD C signal. The LOAD C signal is applied to AND gate 3 to cause register C (reference numeral 8) to be loaded with the EOT address at the next bit time. The output of AND gate 72 is also connected to provide a positive INPUT S signal simultaneous with the LOAD C signal. The INPUT S signal is applied to the set input of flip-flop 37 to provide a positive INPUT signal therefrom at the next bit time. Also, during the positive LOAD C and INPUT S signals the output of AND gate 72 is also gated through OR gate 74 to provide a positive OUTPUT R signal that is applied to reset flip-flop 38 at the next bit time.

At the next bit time the positive INPUT signal from flip-flop 37 is applied to an input device 19 (FIG. 1) to cause a block of variables to be written into memory 17 via WRITE memory control 21. It will be understood that the block of variables, containing, for example, a plurality of fields including the name, address, etc., of one individual, is written into memory 17 immediately succeeding the REPEAT code after the form emvelope. Thus, the first character of variables is written over the EOT code. When the end of the block of variables is detected at the input device, a signal controlled by the input device is applied to flip-flop 37 to reset this flip-flop at the bit time thereafter. Each of the fields of the block of variables is loaded into memory 17 from input devices 19 is assumed to be associated with the same person or entity. That is, each of the fields of variables in the block of variables is associated with the same record. Following the last code of the block of variables written into the memory at any time, it is assumed that input device 17 provides a WRITE EOT signal to AND gate 18 to load an EOT code into memory 17 immediately following the block of variables. Memory organization, therefore, is now as follows:

FORM LETTER-REPEAT CODE-FORM
ENVELOPE-REPEAT CODE-VARIABLES-EOT

Immediately after the new EOT code is written into the memory, and when flip-flop 37 becomes reset, a positive signal is generated by AND gate 88 by virtue of positive AUX 1, $\overline{\text{INPUT}}$, $\overline{\text{OUTPUT}}$, and $\overline{\text{ENV}}$ signals applied thereto. This signal is gated through OR gate 100 to generate a positive GATE C signal, which is then applied to AND gate 11 and OR gate 15 to load the register C contents into address counter 13 via AND gate 14 at the next bit time. It will be understood that address counter 13 will then point to the storage location in memory 17 containing the first code of the variables.

During the time that the GATE C signal is positive OR gate 71 provides a positive OUTPUT S signal originating at AND gate 69 having inputs previously described. The OUTPUT S signal sets flip-flop 38 at the next bit time to provide a positive OUTPUT signal therefrom. With the positive OUTPUT signal, a positive PRINT signal is generated by AND gate 68 having inputs previously described. The positive PRINT signal is applied to the OUTPUT device 20 to cause printing of the first character of the variables onto the personalized form letter. The positive OUTPUT signal at this time also enables a positive COUNT signal to cause the address counter 13 to be successively incremented through the variables for continued printing of the variables until a SWITCH code in the variables is detected.

At the bit time at which the SWITCH code in the variables is read from the memory onto data bus 23, a positive SW code is output from AND gate decode 25. This causes the PRINT signal to go negative because of the negative input to AND gate 68 from INVERT circuit 65, which, therefore, causes printing of the variables to cease.

During the next bit time, the COUNT signal remains positive to increment the address counter 13 by one more count and the AUX 2 S signal is generated at OR gate 59 to set flip-flop 36 at the following bit time. At this following bit time, the LOAD B and GATE B signals are again generated by OR gates 84 and 87, respectively, to cause an exchange of the address contents of register B with the address count in address counter 13. Thus, register B becomes loaded with the next address after the first SWITCH code in the variables while the address counter 13 becomes loaded with the next address after the first SWITCH code in the form letter.

At the next bit time, flip-flop 36 becomes reset because of the positive reset signal from INVERT circuit 40. The PRINT signal again becomes positive because of the lack of a SWITCH code and because the $\overline{AUX\ 2}$ signal is now positive. Thus, printing of the constant portion of the form letter continues. The COUNT signal is now positive so that address counter 13 is incremented through the memory to continue printing the constant portion of the form letter.

Assume now that a SKIP code is encountered in the constant portion of the form letter. The decoding of a SKIP code on data bus 23 by AND gate decode 26 generates a positive SK signal at the output of AND gate 26. This signal, along with the positive OUTPUT and $\overline{AUX\ 2}$ signals applied to AND gate 75 causes this AND gate to generate a positive SKIP S signal that is applied to flip-flop 39 to set this flip-flop at the next bit time. At the bit time at which the SKIP code is detected, printing ceases because the PRINT signal goes negative. During this time, the AUX 2 S signal is again generated at OR gate 59 to cause flip-flop 36 to become set at the next bit time.

At this next bit time, when flip-flops 36 and 39 become set, the COUNT signal again goes negative and the contents of register B and address counter 13 are again exchanged. At the next bit time after this, the COUNT signal again becomes positive and the address counter 13 is incremented through the field of variables following the first SWITCH code in the variables. No printing takes place at this time because the PRINT signal is negative by virtue of the lack of a positive $\overline{SKIP}$ signal from flip-flop 39.

Assume now that before the next SWITCH code in the variables is read, the EOT code is output from memory 17 onto data bus 23 to enable a positive EOT signal output from AND gate decode 27. The COUNT signal from AND gate 81 goes negative because of the positive EOT signals which drives the output of INVERT circuit 80 negative. The LOAD C and INPUT S signals are again generated by AND gate 72 as well as the OUTPUT R signal that is gated through OR gate 74. The LOAD C signal is applied to AND gate 3 to load register C with the memory 17 address of the EOT code following the variables which is presently stored in address counter 13.

As previously described relative to the decoding of an EOT code, at the next bit time flip-flop 38 becomes reset and flip-flop 37 becomes set to generate the positive INPUT signal that is applied to the input 19 to cause another block of variables to be written into memory 17 via WRITE memory control 21. At the end of this next block of variables, a signal controlled by input device 19 is applied to AND gate 18 to enable the writing of an EOT code in the memory following the last variable in the block. At this time, a RESET signal from input device 19 is applied to flip-flop 37 to reset this flip-flop at the next bit time thereafter. When flip-flop 37 becomes reset, a positive $\overline{INPUT}$ signal thereform enables AND gate 88 to provide a positive GATE C signal that is gated through OR gate 100 and applied to AND gate 11 and OR gate 15 to gate the contents of register C through AND gate 14 into address counter 13. It will be remembered that this address is the address of the last previous EOT code which, presently, is the address in memory of the first code of the most recent block of variables loaded into the memory. During this same time the OUTPUT S signal is generated by AND gate 69 and gated through OR gate 71 to be applied to the set input of flip-flop 38. At the next bit time thereafter, flip-flop 38 becomes set to provide a positive OUTPUT signal. The OUTPUT signal enables the COUNTER signal to provide continued incrementing of address counter 13 from the most recently loaded block of variables.

Eventually, a SWITCH code is detected in the variables and a positive SW signal is provided by AND gate 25. A SKIP R signal is then generated by AND gate 76 which has inputs of OUTPUT, SW, and $\overline{AUX\ 2}$. At the same time, the AUX 2 S signal is provided through OR gate 59 from AND gate 58. At the succeeding bit time, therefore, flip-flop 36 becomes set to provide a positive AUX 2 signal and flip-flop 39 becomes reset to provide a positive $\overline{SKIP}$ signal. The COUNT signal goes negative because flip-flop 36 is set and the positive LOAD B and GATE B signals provided at OR gates 84 and 87, respectively, cause the contents of register B and contents of address counter 13 to again become exchanged.

At the following bit time, flip-flop 36 becomes reset to provide a positive $\overline{AUX\ 2}$ output signal which allows AND gate 68 to provide a positive PRINT signal that is applied to output printer device 20 to enable continued printing of the constant text portion of the form letter stored in memory 17. The positive $\overline{AUX\ 2}$ signal also enables a positive COUNT signal from AND gate 81 that is applied to address counter 13 to enable continued incrementing of address counter 13 through the constant portion of the form letter in memory 17.

Assume now that a REPEAT code has been output from memory 17 via read memory control 22 onto data bus 23. The REPEAT code is decoded by AND gate decode 24 to provide a positive RPT signal which causes the PRINT signal from AND gate 68 to go negative. Printing ceases at this point. Detection of the REPEAT code in the form letter indicates that printing of the form letter has been completed.

Assume now that a copy of the form letter is desired. The positive OUTPUT and RPT signals are input to AND gate 73 to provide a positive output therefrom that is gated through OR gate 74 to produce the positive OUTPUT R signal that is applied to the reset input of flip-flop 38. The positive OUTPUT, RPT, COPY, AND $\overline{\text{ENV}}$ signals are applied to AND gate 43. A fifth input to AND gate 43 is the positive PRINT COPY signal that is applied to the system when a copy of the personalized form letter is desired. With all inputs to AND gate 43 positive, a positive COPY S output signal is provided therefrom that is applied to the set input of flip-flop 33. At the same time, the positive OUTPUT, RPT, $\overline{\text{COPY}}$ and $\overline{\text{ENV}}$ signals are applied to inputs of AND gate 55. The positive PRINT COPY signal is gated through OR gate 54 to the fifth input of AND gate 55 to provide a positive OUTPUT signal therefrom that is gated through OR gate 56 to provide the positive AUX 1 R signal that is applied to the reset input of flip-flop 35.

Thus, at the next succeeding bit time, flip-flop 33 becomes set and flip-flops 35 and 38 become reset to provide positive COPY, $\overline{\text{AUX 1}}$, and $\overline{\text{OUTPUT}}$ signals, respectively. At the same time, the COUNT signal becomes negative because flip-flop 38 is reset. Also, at this time, the positive COPY signal is gated through OR gate 61 to an input of AND gate 60. The other inputs to AND gate 60, $\overline{\text{AUX 2}}$ and $\overline{\text{OUTPUT}}$, are positive at this time so that a positive OUTPUT signal from AND gate 60 is applied to an input of AND gate 62. The other input of AND gate 62, $\overline{\text{AUX 1}}$, is also positive at this time so that a positive OUTPUT signal from AND gate 62 is gated through OR gate 62 to provide a positive GATE A signal that is applied to AND gate 9 and OR gate 15 to gate the contents of register A into address counter 13 via AND gate 14. The previously mentioned positive output signal from AND gate 60 is also gated through OR gate 59 to generate a positive AUX 2 S signal that is applied to the set input of flip-flop 36.

At the following bit time flip-flop 36 becomes set to provide a positive AUX 2 signal. The positive COPY, AUX 2, and $\overline{\text{OUTPUT}}$ signals are applied to input of AND gate 78 to provide a positive output signal therefrom that is gated through OR gate 79 to provide a positive RESET signal. The positive RESET signal is applied to address counter 13 to reset the contents of this counter to zero at the following bit time. At the same time, a positive LOAD B signal is gated through OR gate 84 from AND gate 83 by virtue of the positive AUX 2 signal applied thereto as well as the positive $\overline{\text{AUX 1}}$ signal that is gated through OR gate 82. The LOAD B signal is applied to AND gate 2 to cause the contents of address counter 13 to be gated through AND gate 2 into register B at the following bit time. Thus, the register A contents are transferred through address counter 13 into register B. The address that will then be stored in register B is that of the first code of variables.

When the address counter 13 is reset at the following bit time, the zero count therein will point to the beginning of memory which is the first storage location of the constant, form letter text. At this bit time during which the AUX 2 signal is positive, this signal and positive $\overline{\text{AUX 1}}$ and $\overline{\text{OUTPUT}}$ signals are applied to inputs of AND gate 70. Applied to a fourth input of AND gate 70 is the positive COPY signal gated through OR gate 61. A positive output signal of AND gate 70 is gated through OR gate 71 to provide the positive OUTPUT S signal that is applied to the set input of flipflop 38.

Printing of the copy begins at the next succeeding bit time. Flip-flop 38 becomes set at this time to provide a positive OUTPUT signal. Flip-flop 36 is reset at this time to provide the positive $\overline{\text{AUX 2}}$ signal. A positive OUTPUT and $\overline{\text{AUX 2}}$ signals enable (with the aid of other positive inputs previously described) AND gate 68 to provide a positive PRINT signal that is applied to output printer device 20 to cause printing of the first character of the constant form letter text. At the same time, the positive OUTPUT, $\overline{\text{AUX 2}}$ and $\overline{\text{EOT}}$ signals enable AND gate 81 to provide a positive COUNT signal that is applied to address counter 13 to cause output from the memory of successive characters stored therein while the PRINT signal is positive.

Eventually a SWITCH code in the text is detected from data bust 23 which causes the PRINT signal to go negative. As previously described with regard to the original, the COUNT signal is positive for one more bit time to allow the address counter 13 to point to the next character after the SWITCH code. At that time, the contents of register B are exchanged with the contents of address counter 13 and printing of the variables can begin thereafter until a SWITCH code in the variables is detected, at which time address counter 13 is switched back to the form letter for continued printing. Thus, printing of the copy is essentially identical to printing of the original with the exception that all of the variables needed for the copy are already in the memory and it is not necessary to suspend printing for loading one or more blocks of variables into the memory while the copy is being printed. This is one of the advantages of the invention that should be noted, since time is saved and input device wear is reduced by having to read the variables into the memory only once.

At the conclusion of the printing of the copy of the letter, the REPEAT code will again be encountered to enable a positive RPT signal from AND gate decode 24. The positive RPT signal provides a positive OUTPUT R signal from AND gate 73 through OR gate 74 to be applied to the reset input of flip-flop 38. The positive OUTPUT, RPT, and COPY signals input to AND gate 44 enable the generation of a positive COPY R signal at the output thereof that it applied to the reset input of flip-flop 33. A positive COPY R signal is also gated through OR gate 45 to provide a positive ENV S signal that is applied to the set input of flip-flop 34.

At the following bit time, therefore, flip-flops 38 and 33 are reset and flip-flop 34 becomes set. When flip-flop 38 becomes reset, the OUTPUT signal goes negative so that the COUNT signal from AND gate 81 also goes negative. The positive ENV, $\overline{\text{OUTPUT}}$, $\overline{\text{AUX 2}}$, and $\overline{\text{AUX 1}}$ present at this time are also applied to AND gate 97 to generate a positive signal that is gated through OR gate 98 to generate a positive LOAD C signal, which is then applied to AND gate 3 to load register C with the current contents of address counter 13 at the next bit time. It will be understood that this address loaded into register C is the address at the first code of the form envelope, since it is the address following the REPEAT code at the end of the form letter. The GATE A signal becomes positive at this time (under conditions previously described) and is applied to AND gate 9 and OR gate 15 to gate the contents of register A into address counter 13, via AND gate 14, at the next bit time. It will again be remembered that the register A contents are the memory address of the first code of the variables. In this bit time a positive AUX 2 S signal is generated at AND gate 60 and is gated through OR gate 59 to be applied to the set input of flip-flop 36.

At the next bit time, flip-flop 36 becomes set to provide a positive AUX 2 signal. The positive AUX 2 and $\overline{\text{AUX 1}}$ signals provide a positive LOAD B signal from AND gate 83 that is gated through OR gate 84 and applied to AND gate 2 to cause the address counter 13 contents to be gated into register B at the next bit time. The positive signals ENV, $\overline{\text{OUTPUT}}$, AUX 2, and $\overline{\text{AUX 1}}$ are input to AND gate 99 to provide a positive signal output therefrom that is gated through OR gate 100 to generate a positive GATE C signal, which is applied to AND gates 11 and 15 to cause the contents of register C (beginning address of the form envelope) to be gated into address counter 13, via AND gate 14, at the next bit time.

Printing or execution of control codes, such as tabs, from the constant portion of the form envelope begins at this next bit time. The positive AUX 2, $\overline{\text{AUX 1}}$, $\overline{\text{OUTPUT}}$, and ENV signals that existed immediately prior to this bit time provided a positive OUTPUT S signal from AND gate 70 that was gated through OR gate 71 to be applied to the set input of flip-flop 38. Flip-flop 38 is then set at this present bit time at which printing begins. Flip-flop 36 becomes reset at this time because of the positive OUTPUT signal from invert circuit 40 applied to the reset input thereof. Thus, at this bit time a positive PRINT signal is generated by AND gate 68 that is applied to output printer device 20 to cause printing or execution of the constant portion of the form envelope. The positive OUTPUT, $\overline{\text{AUX 2}}$, and $\overline{\text{EOT}}$ signals applied to the inputs of AND gate 81 enable the positive COUNT signal therefrom that is applied to address counter 13 to upwardly increment accessing of the memory to cause further output of the form envelope codes.

Output of the form envelope codes continues until a SWITCH code in the form envelope is detected. When the SWITCH code is detected, the memory address counter 13 is bumped one more count and the contents thereof are exchanged with the current contents of register B. This accesses the beginning of the variables in the memory and printing of the envelope thereafter continues from the variables until a SWITCH code in the variables is detected to halt printing and cause an exchange of addresses to occur to provide continued printing from the form envelope. This operation is identical to printing of the letters. As in the letters, a SKIP code in the form envelope causes printing of the envelope to be interrupted while a field of the variables is skipped, after which printing of the form envelope resumes. Finally, a REPEAT code at the end of the form envelope codes causes the PRINT signal to go negative. A positive OUTPUT R signal is provided by AND gate 73 and is gated through OR gate 74 to be applied to the reset input of flip-flop 38. A positive signal is generated at AND gate 53 having positive inputs of ENV, OUTPUT, and RPT. This positive signal is gated through OR gate 52 to generate a positive AUX 1 S signal, which is then applied to the set input of flip-flop 35.

At the following bit time, flip-flop 38 becomes reset to provide a positive $\overline{\text{OUTPUT}}$ signal and flip-flop 35 becomes set to provide a positive AUX 1 signal. Stepping of the memory address counter 13 ceases at this time because the COUNT signal is now negative by virtue of the negative OUTPUT signal. A positive GATE B signal is generated by OR gate 87 from AND gate 86 having positive inputs of ENV, AUX 1 and $\overline{\text{AUX 2}}$. The positive GATE B signal is applied to AND gate 10 and OR gate 15 to gate the contents of register B through AND gate 14 into memory address counter 13 at the following bit time.

At the following bit time, address counter 13 now addresses the character in memory following the last character of variables. Assume now that an end of job (EOJ) code following the variables is currently being accessed in the memory and is placed on data bus 23. The EOJ code is decoded by AND gate decode 28 to provide a positive EOJ signal at the output thereof that is applied to an input of AND gate 42. Flip-flops 35 and 36 are set at this bit time to provide positive AUX 1 and AUX 2 inputs of AND gate 42 and, finally, a positive $\overline{\text{OUTPUT}}$ signal is applied to a fourth input of AND gate 42 to provide a positive MERGE R signal therefrom that is applied to the reset input of flip-flop 32. Thus, at the next bit time thereafter, flip-flop 32 resets and the operation of merging constant text and variables for letters and envelopes is over.

Assume, on the other hand, that when the address counter 13 is loaded with the register B contents to point to the next character after the end of the variables, an EOT code is decoded by AND gate decode 27 to provide a positive EOT signal therefrom. During the bit time that the positive EOT signal is decoded, the ENV R signal is provided by AND gate 48 having the positive inputs of $\overline{\text{OUTPUT}}$, AUX 1, and AUX 2. This signal is also gated through OR gate 63 to provide a positive GATE A signal. The GATE A signal is applied to AND gate 9 and OR gate 15 to gate the contents of register A into counter 13 through AND gate 14 at the next bit time. It will be remembered that register A points to the beginning address of the variables.

At the following bit time, flip-flop 34 becomes reset because of the positive ENV R signal generated at the preceding bit time and applied to the reset input thereof. Flip-flops 35 and 36 also become reset at the beginning of this next bit time and the outputs of the remaining flip-flops and pertinent logic circuits are identical to the outputs thereof when the MERGE flip-flop 32 became set at the beginning of the merge operation. That is, a new EOT code is written at the address stored in register A and currently loaded into address counter 13 to point to the beginning address of the variables. Printing of the form letter resumes and new blocks of variables associated with a different record are loaded into the memory and merged with the constant, form letter text. This operation can continue for this letter, one or more copies, and envelopes for as many different records as are available. At the end of the last block of variables in the last letter an EOJ code is used, as described above, to reset the MERGE flip-flop 32 to discontinue this merging operation.

It will, of course, be understood by those skilled in the art that if copies are not desired the PRINT COPY signal is not positive at any time during the operation and, accordingly, flip-flop 34 is set to begin the envelope printing operation by a positive output signal from OR gate 45 from AND gate 47 having positive inputs of OUTPUT and RPT, as well as a positive $\overline{\text{PRINT COPY}}$ signal being provided by INVERT circuit 46 as the complement of a negative PRINT COPY signal then present. Similarly, it will be understood that if the printing of an envelope is not desired, a negative PRINT ENV signal will be present throughout the operation that is inverted by INVERT circuit 50 to provide a positive input to AND gate 51. The other input to AND gate 51 is the positive COPY R signal. When these signals are present at AND gate 51 a positive output signal is generated therefrom that is gated through OR gate 52 to provide the positive AUX 1 S signal. Further, if an envelope but no copy is desired the PRINT COPY signal is negative and the PRINT ENV signal is positive. Thus, flip-flop 35 is reset by a positive AUX 1 R signal from OR gate 56 which receives a positive input signal from AND gate 55. AND gate 55 has a positive PRINT ENV input signal (gated through OR gate 54) as well as other previously described positive inputs.

Thus, a system and method for interleaved printing of letters and envelopes in an unattended manner has been described. Text codes and control codes corresponding to a form letter and envelope to be printed are stored in the first portion of a memory. Blocks of variable data associated with a particular record are then written into the memory, as needed, succeeding the form letter and envelope. The system is operative to output the contents of the memory to a printer while merging the variable data with first the form letter and then the envelope for a completed letter followed by the envelope. Skip logic is provided to utilize a selected field of the record exclusively in either the letter or envelope. Logic is also provided to print more than one copy of the same letter before printing the envelope. All of the printing relactive to a particular record is performed before the next record is read so that distribution of the letter to all recipients can begin when the next record is read.

While the invention has been particularly shown and described with reference to a preferred embodiment thereof, it will be understood by those skilled in the art that the foregoing and other changes in form and details may be made therein without departing from the spirit and scope of the invention. For example, it will be understood by those skilled in the art that a STOP code, rather than a SKIP code could be decoded to cause the skipping function taught herein with respect to a SKIP code. It will also be appreciated that well known sheet and envelope feeding mechanisms, not a part of this invention may be interconnected with the disclosed logic to simplify unattended operation of the system. Further, it will be appreciated that the printing of more than one copy can be provided by slight logic modifications that will be obvious to those having skill in the art.

What is claimed is:

1. A printing system for interleaved, unattended printing of a plurality of personalized letters and envelopes, comprising:
    memory means for storing codes corresponding to a single form letter and form envelope, said codes including constant text and control codes;
    a plurality of records of codes of variable data, each record of variable data being stored on a storage means and each record including a plurality of fields;
    variable data input means for writing blocks of codes of variable data of one of said records into a portion of said memory means;
    a printer;
    means for repetitively outputting the contents of said memory to said printer to print said personalized letters and envelopes, including;
    means responsive to said control codes in said form letter to merge the variable data contained in a first group of chosen fields of each record into said constant text of said form letter; and
    means responsive to said control codes in said form envelope to include the variable data contained in a second group of chosen fields of each record in said form envelope.

2. The printing system of claim 1 further comprising means for detecting SWITCH codes in said memory, means for accessing said form letter codes until a SWITCH code in said form letter is detected, and means for activating said means for writing one of said blocks of variable data into said memory.

3. The printing system of claim 2 wherein said means for outputting further comprises means for accessing said variable data in said memory until a SWITCH code in said variable data is detected and means for reverting to accessing said form letter codes upon the detection of said SWITCH code in said variable data.

4. The printing system of claim 3 further comprising means for detecting a REPEAT code in said memory and means upon the detection of a REPEAT code immediately following said form letter to print a copy of said form letter.

5. The printing system of claim 3 further comprising means for decoding a combination of codes representative of a skip function, means in response to said decoding for successively accessing the codes of the next field of variables of said record without printing and means responsive to said accessing for deriving a memory address of the first code of variables beyond the skipped field of variables.

6. The printing system of claim 1 further comprising means for detecting SWITCH codes in said memory, means for accessing said form envelope codes until a SWITCH code in said form envelope is detected, means for accessing said variable data in said memory until a SWITCH code in said variable data is detected, and means for reverting to accessing said form envelope codes upon the detection of said SWITCH code in said variable data.

7. A method of printing personalized letters and envelopes, comprising:
    (a) storing text codes and control codes corresponding to a form letter and a form envelope in a first portion of a memory;
    (b) printing text codes and executing control codes stored in said first portion of said memory until a SWITCH code is detected;
    (c) storing text codes and control codes corresponding to a block of variable data associated with a single record in a second portion of said memory;
    (d) printing said variable data until a SWITCH code is detected therein;
    (e) alternating steps (b) and (d) when SWITCH codes are detected in said variable data and in said form letter and form envelope and including step (c) as each additional block of variable data associated with said single record is required; including
    (f) detecting a SKIP code in said control codes of said form letter and envelope;
    (g) skipping a first field of codes of variable data of said record as indicated by a SKIP code in said form letter when printing said letter; and
    (h) skipping a second field of codes of variable data of said record as indicated by a SKIP code in said form envelope when printing said envelope.

8. The method of printing personalized letters and envelopes of claim 7 further comprising:
    (g) executing steps (b) through (f) with different blocks of variable data associated with a different record.

* * * * *